(12) United States Patent
Asano (10) Patent No.: US 7,777,121 B2
(45) Date of Patent: Aug. 17, 2010

(54) INFORMATION PROCESSING APPARATUS, INFORMATION PROCESSING METHOD, AND COMPUTER PROGRAM

(75) Inventor: Yasuharu Asano, Kanagawa (JP)

(73) Assignee: Sony Corporation, Tokyo (JP)

( * ) Notice: Subject to any disclaimer, the term of this patent is extended or adjusted under 35 U.S.C. 154(b) by 63 days.

(21) Appl. No.: 12/189,081

(22) Filed: Aug. 8, 2008

(65) Prior Publication Data

US 2009/0055006 A1    Feb. 26, 2009

(30) Foreign Application Priority Data

Aug. 21, 2007    (JP) .................... P2007-214406

(51) Int. Cl.
*G10H 1/00*    (2006.01)
(52) U.S. Cl. .................... 84/600; 84/601; 707/104.1
(58) Field of Classification Search ........... 84/600–602; 707/104.1
See application file for complete search history.

(56) References Cited

U.S. PATENT DOCUMENTS

| | | | |
|---|---|---|---|
| 2004/0199387 A1* | 10/2004 | Wang et al. | 704/243 |
| 2006/0080356 A1* | 4/2006 | Burges et al. | 707/103 R |
| 2006/0285818 A1* | 12/2006 | Murabayashi | 386/46 |
| 2007/0088633 A1* | 4/2007 | Phillips | 705/28 |
| 2007/0106406 A1* | 5/2007 | Makino et al. | 700/94 |
| 2007/0198511 A1* | 8/2007 | Kim et al. | 707/6 |
| 2007/0220552 A1* | 9/2007 | Juster et al. | 725/46 |
| 2008/0022844 A1* | 1/2008 | Poliner et al. | 84/609 |
| 2008/0263476 A1* | 10/2008 | Vignoli et al. | 715/810 |
| 2008/0288255 A1* | 11/2008 | Carin et al. | 704/256.1 |
| 2009/0006353 A1* | 1/2009 | Vignoli et al. | 707/5 |
| 2009/0007230 A1* | 1/2009 | Johnson et al. | 726/2 |
| 2009/0030691 A1* | 1/2009 | Cerra et al. | 704/255 |
| 2009/0132453 A1* | 5/2009 | Hangartner et al. | 706/46 |
| 2009/0158342 A1* | 6/2009 | Mercer et al. | 725/46 |
| 2009/0217806 A1* | 9/2009 | Makino et al. | 84/616 |
| 2009/0288546 A1* | 11/2009 | Takeda | 84/612 |

FOREIGN PATENT DOCUMENTS

| | | |
|---|---|---|
| JP | 2002-333892 | 11/2002 |
| JP | 2006-293246 | 10/2006 |

* cited by examiner

*Primary Examiner*—David S. Warren
(74) *Attorney, Agent, or Firm*—Finnegan, Henderson, Farabow, Garrett & Dunner, L.L.P.

(57) ABSTRACT

An information processing apparatus performing a process for generating a playlist defining a reproduction sequence of contents includes: a model information holding part storing therein probability models corresponding to a time series pattern of content feature volumes being feature information about contents; a content feature extracting part acquiring a content feature volume corresponding to each of contents to be reproduced; a playlist generating part comparing a time series pattern of the content feature volumes extracted in the content feature extracting part corresponding to each of permutation patterns of a reproduction sequence of contents to be reproduced with a probability model held in the model information holding part, and generating a playlist in which a reproduction sequence of contents is set in accordance with a time series pattern of content feature volumes most analogous to the probability model; and a content reproducing part reproducing contents in accordance with the generated playlist.

13 Claims, 8 Drawing Sheets

INFORMATION PROCESSING APPARATUS, INFORMATION PROCESSING METHOD, AND COMPUTER PROGRAM

CROSS REFERENCES TO RELATED APPLICATIONS

The present invention contains subject matter related to Japanese Patent Application JP 2007-214406 filed in the Japanese Patent Office on Aug. 21, 2007, the entire contents of which being incorporated herein by reference.

BACKGROUND OF THE INVENTION

1. Field of the Invention

The present invention relates to an information processing apparatus, an information processing method, and a computer program, more specifically to an information processing apparatus, an information processing method, and a computer program which perform a process for generating a playlist (reproduction sequence information) that can reproduce contents (such as pieces of music, still images, and moving images) in accordance with user's tastes.

2. Description of the Related Art

In reproducing apparatuses for various contents such as pieces of music, still images, and moving images, for example, in apparatuses that read a content from a recording medium such as a DVD, a HDD, and a flash memory having a large number of contents stored thereon for reproducing the content, some of them have a configuration in which a list that decides the reproduction sequence of contents, that is, a playlist can be set for reproduction processing in the order of the contents described in the playlist. A user can continuously reproduce contents, pieces of music, for example, in accordance with the playlist.

Although the playlist can be generated in such a way that a user confirms contents stored in a medium and arranges the contents in a reproduction sequence in accordance with user's favorites, such a method is also implemented that a playlist is automatically generated in accordance with a user's listening/viewing history, for example. For instance, there is a technique of generating a playlist in which a distance (such as a cosine function) between user taste information that is generated by accumulating the attributes (such as titles, artists, genres, and reviews) of pieces of music listened by a user so far and a reproducible piece of music is found to set a piece of music with a shorter distance in a playlist and pieces of music that the user is considered to like are continuously reproduced. Moreover, such a technique of generating a playlist is also proposed that pieces of music with a distance closer to a number reproduced just before are continuously reproduced. In addition, as contents to be set in a playlist, there are various contents such as pieces of music, still images, and moving images, but in the discussions below, a piece of music is taken as a typical example for discussion.

However, when a playlist is generated in accordance with user taste information generated based on a user's listening/viewing history in the past, basically piece of music in similar tunes are to be continuously reproduced. For example, in the case in which user taste information indicates that a user is fond of slow numbers, or in the case in which a piece of music reproduced just before is a slow number, there is a problem that slow numbers are continuously reproduced to bore the user.

As a method of solving this problem, a method is proposed in which a playlist is generated in such a way that a particular attribute of a piece of music such as the tempo of a piece of music to be reproduced is changed. For example, Patent Reference 1 (see JP-A-2002-333892) discloses such a technique of generating a playlist.

In addition, Patent Reference 2 (see JP-A-2006-293246) discloses such a technique that certain fluctuations are given between the previous and next numbers with respect to the sequence of reproducing pieces of music, whereby a user is prevented from being bored.

SUMMARY OF THE INVENTION

In the technique of generating a playlist described in Patent Reference 1, selection is made for the contents to be reproduced in accordance with user's tastes, but it does not specifically describe how the selected contents are sequenced for reproduction. In addition, in the technique of generating a playlist described in Patent Reference 2, only fluctuations are given to the reproduction sequence and it is difficult for the method to adapt the reproduction sequence in accordance with personal tastes.

It is desirable to provide an information processing apparatus, an information processing method, and a computer program which can select contents in accordance with user's tastes as well as can properly decide a reproduction sequence of contents to adapt the reproduction sequence to user's tastes.

An information processing apparatus according to an embodiment of the invention is an information processing apparatus which performs a process for generating a playlist that defines a reproduction sequence of contents including: a model information holding part configured to store therein a plurality of probability models each corresponding to a time series pattern of content feature volumes, the content feature volume being feature information about a content; a content feature extracting part configured to acquire a content feature volume corresponding to each of a plurality of contents to be reproduced; a playlist generating part configured to compare a time series pattern of the content feature volumes extracted in the content feature extracting part corresponding to each of a plurality of permutation patterns of a reproduction sequence of contents to be reproduced with a probability model held in the model information holding part, and generates a playlist in which a reproduction sequence of contents is set in accordance with a time series pattern of content feature volumes most analogous to the probability model; and a content reproducing part configured to reproduce contents in accordance with the playlist generated in the playlist generating part.

Moreover, in the information processing apparatus according to the embodiment of the invention, the content reproducing part is configured to perform a process in which the content reproducing part generates and stores content reproduction history information in a content reproduction history information holding part, the information processing apparatus further includes: an optimal model selecting part configured to compare a time series pattern of content feature volumes corresponding to a reproduction history matched with content reproduction history information stored in the content reproduction history information holding part with a plurality of probability models held in the model information holding part, and to select a probability model most analogous to the time series pattern of content feature volumes corresponding to the reproduction history as an optimal model, wherein the playlist generating part compares a time series pattern of the content feature volumes extracted in the content feature extracting part corresponding to each of a plurality of permutation patterns of a reproduction sequence of contents to be reproduced with the optimal model, and generates a playlist in which a reproduction sequence of contents corresponding to a time series pattern of content feature volumes most analogous to the optimal model.

Moreover, in the information processing apparatus according to the embodiment of the invention, the content reproducing part is configured to perform a process in which the content reproducing part generates and stores content reproduction history information in a content reproduction history information holding part, and the information processing apparatus further includes: a model adapting part configured to perform a probability model update process in which the model adapting part generates a time series of content feature volumes corresponding to a reproduction history matched with content reproduction history information stored in the content reproduction history information holding part and adapts a parameter included in the generated time series of content feature volumes corresponding to the reproduction, history to a probability model held in the model information holding part, whereby the model adapting part approximates the probability model to the time series of content feature volumes corresponding to the reproduction history.

Moreover, in the information processing apparatus according to the embodiment of the invention, the information processing apparatus further includes: a model creating part configured to generate a probability model to which sample data containing a reproduction sequence of contents is adapted, to perform a learning process for the created probability model to create a plurality of different probability models, and to store the created probability model in the model information holding part.

Moreover, in the information processing apparatus according to the embodiment of the invention, the information processing apparatus further includes: a reproduction content selecting part configured to select a plurality of contents configured of a series analogous to a probability model held in the model information holding part as contents to be reproduced.

Moreover, in the information processing apparatus according to the embodiment of the invention, the model information holding part is configured to store therein a probability model in accordance with a hidden Markov model (HMM) as a probability model corresponding to a time series pattern of content feature volumes, the content feature volume being feature information about a content.

Moreover, in the information processing apparatus according to the embodiment of the invention, the content feature volume includes at least any one of feature information about a data signal configuring a content and metainformation corresponding to a content.

Moreover, an information processing method according to an embodiment of the invention is an information processing method which performs a process for generating a playlist that defines a reproduction sequence of contents in an information processing apparatus, the method including the steps of: extracting a content feature wherein a content feature extracting part acquires a content feature volume corresponding to each of a plurality of contents to be reproduced; generating a playlist wherein a playlist generating part compares a time series pattern of the content feature volumes extracted in the step of extracting a content feature corresponding to each of a plurality of permutation patterns of a reproduction sequence of contents to be reproduced with a probability model held in advance in a model information holding part, and generates a playlist in which a reproduction sequence of contents is set in accordance with a time series pattern of content feature volumes most analogous to the probability model; and reproducing contents wherein a content reproducing part reproduces contents in accordance with the playlist generated in the step of generating a playlist.

Moreover, in the information processing method according to the embodiment of the invention, the information processing method further including the steps of: generating a content reproduction history wherein the content reproducing part generates and stores content reproduction history information in a content reproduction history information holding part; and selecting an optimal model wherein an optimal model selecting part compares a time series pattern of content feature volumes corresponding to a reproduction history matched with content reproduction history information stored in the content reproduction history information holding part with a plurality of probability models held in the model information holding part, and selects a probability model most analogous to the time series pattern of content feature volumes corresponding to the reproduction history as an optimal model, wherein the step of generating a playlist is the step of comparing a time series pattern of the content feature volumes extracted in the step of extracting a content feature corresponding to each of a plurality of permutation patterns of a reproduction sequence of contents to be reproduced with the optimal model, and generating a playlist in which a reproduction sequence of contents corresponding to a time series pattern of content feature volumes most analogous to the optimal model.

Moreover, in the information processing method according to the embodiment of the invention, the information processing method further including the steps of: generating a content reproduction history wherein the content reproducing part generates and stores content reproduction history information in a content reproduction history information holding part; and adapting a model wherein a model adapting part performs a process in which the model adapting part adapts a parameter included in a time series of content feature volumes corresponding to a reproduction history matched with content reproduction history information stored in the content reproduction history information holding part to a probability model held in the model information holding part, whereby the model adapting part approximates the probability model to the time series of content feature volumes corresponding to the reproduction history.

Moreover, in the information processing method according to the embodiment of the invention, the information processing method further including the step of: generating a model wherein a model creating part generates a probability model to which sample data containing a reproduction sequence of contents is adapted, performs a learning process for the created probability model to create a plurality of different probability models, and stores the created probability model in the model information holding part.

Moreover, in the information processing method according to the embodiment of the invention, the information processing method further including the step of: selecting contents to be reproduced wherein a reproduction content selecting part selects a plurality of contents configured of a series analogous to a probability model held in the model information holding part as contents to be reproduced.

Moreover, in the information processing method according to the embodiment of the invention, the model information holding part is configured to store therein a probability model in accordance with a hidden Markov model (HMM) as a probability model corresponding to a time series pattern of content feature volumes, the content feature volume being feature information about a content.

Moreover, in the information processing method according to the embodiment of the invention, the content feature volume includes at least any one of feature information about a data signal configuring a content and metainformation corresponding to a content.

Moreover, a computer program according to an embodiment of the invention is a computer program which allows an information processing apparatus to perform a process for generating a playlist that defines a reproduction sequence of contents, the process including the steps of: extracting a content feature wherein a content feature extracting part is allowed to acquire a content feature volume corresponding to each of a plurality of contents to be reproduced; generating a playlist wherein a playlist generating part is allowed to compare a time series pattern of the content feature volumes extracted in the step of extracting a content feature corresponding to each of a plurality of permutation patterns of a reproduction sequence of contents to be reproduced with a probability model held in advance in a model information holding part and to generate a playlist in which a reproduction sequence of contents is set in accordance with a time series pattern of content feature volumes most analogous to the probability model; and reproducing contents wherein a content reproducing part is allowed to reproduce contents in accordance with the playlist generated in the step of generating a playlist.

In addition, for example, the computer program according to the embodiment of the invention is a computer program offered by a recording medium in the form of a computer readable format in a multi-purpose computer system which runs various programs and pieces of code, and over a communication medium. Such a program is offered in the form of a computer readable format, whereby a process in accordance with the program is implemented on a computer system.

The other purposes, features and advantages according to the embodiment of the invention will be apparent from the detailed description based on an embodiment of the invention, described later, and accompanying drawings. In addition, the system in the specification is the configuration of logical assembly of a plurality of devices, which is not limited to one in which devices in individual configurations are provided in the same cabinet.

According to the embodiment of the invention, in the information processing apparatus which performs a process for generating a playlist that defines a reproduction sequence of contents, it is configured in which a probability model corresponding to a time series pattern of content feature volumes, the feature volume being feature information about a content, is stored in a model information holding part, a time series pattern of content feature volumes corresponding to each of a plurality of permutation patterns of a reproduction sequence of contents to be reproduced is compared with the probability model stored in the model information holding part (a likelihood is calculated), a playlist is generated in which a reproduction sequence of contents is set in accordance with a time series pattern of content feature volumes most analogous to the probability model, and contents are reproduced in accordance with the generated playlist. Thus contents can be reproduced in accordance with user's tastes.

DETAILED DESCRIPTION OF THE INVENTION

Hereinafter, the detail of an information processing apparatus, an information processing method, and a computer program according to embodiments of the invention will be described with reference to the drawings.

Figure 1:
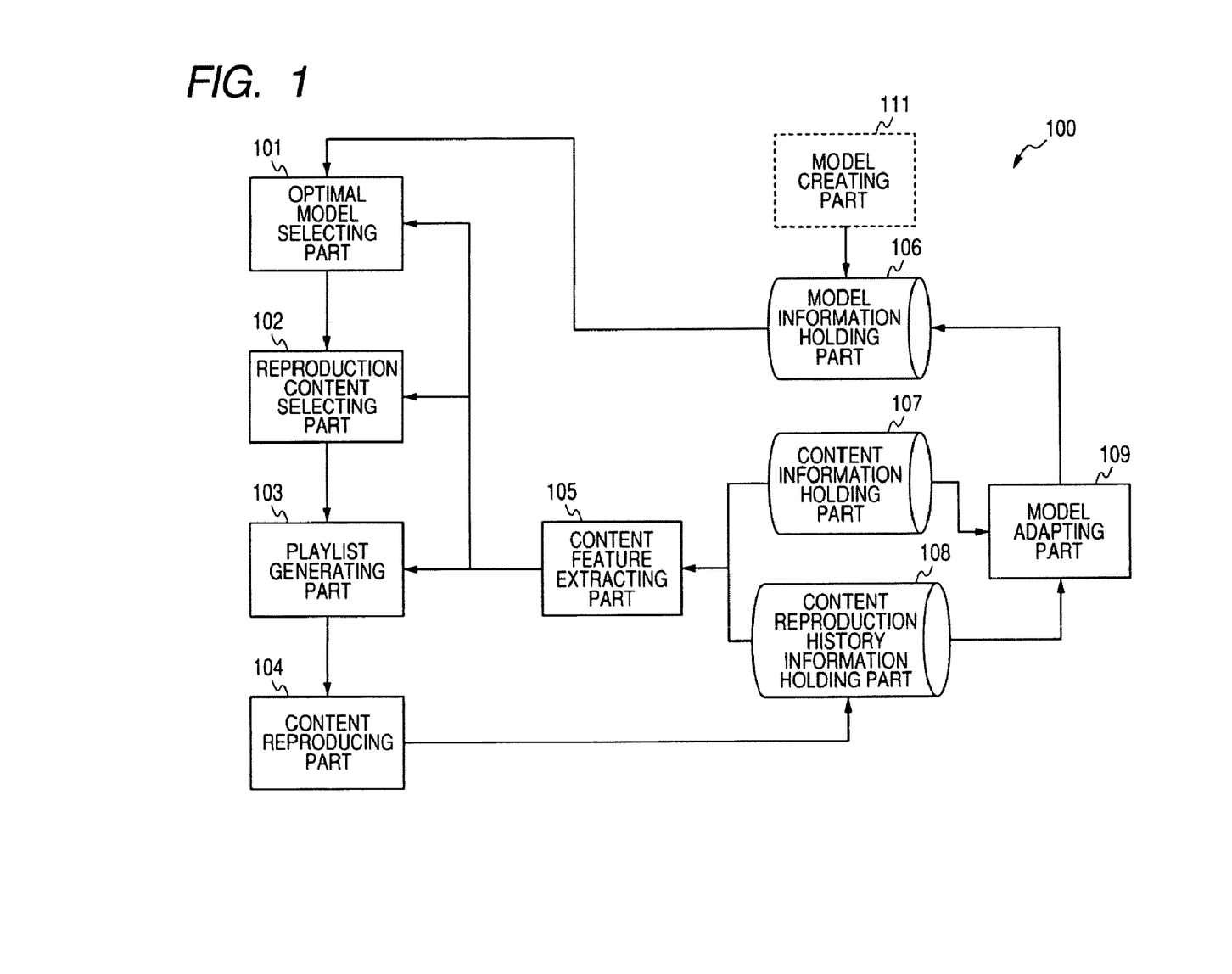
FIG. 1 shows a diagram illustrative of an exemplary configuration and process of an information processing apparatus according to an embodiment of the invention.

The configuration and processes of the information processing apparatus according to an embodiment of the invention will be described with reference to FIG. 1. As shown in FIG. 1, an information processing apparatus 100 according to an embodiment of the invention has an optimal model selecting part 101, a reproduction content selecting part 102, a playlist generating part 103, a content reproducing part 104, a content feature extracting part 105, a model information holding part 106, a content information holding part 107, a content reproduction history information holding part 108, a model adapting part 109, and a model creating part 111.

In addition, the model creating part 111 is a processing part that creates a probability model to be stored in the model information holding part 106, which is unnecessary in such a configuration in which a probability model is already stored in the model information holding part 106 and is not an essential configuration of the information processing apparatus 100. The model creating part 111 performs processes such as the generation and update of a probability model stored in the model information holding part 106.

The content information holding part 107 stores therein content information corresponding to a content to be a target for generating a playlist, that is, a content such as a piece of music. For example, the content information is information about the title of a piece of music and an artist name to be represented to a user. Moreover, the content information holding part 107 stores content information as well as a content feature volume.

The content feature volume is a feature volume to be analyzed by signal processing of a content (such as a piece of music) or a feature volume such as metainformation preset in a content. More specifically, for example, it is information such as the power, pitch, tempo, and types of mood and vocal of a piece of music that is a content. In addition, a specific example of the content feature volume will be described later. The content information holding part 107 is a storage part that stores therein the content information and the content feature volume as described above.

The content feature extracting part 105 acquires a feature volume related to a content stored in the content information holding part 107, generates time series data of the content feature volumes based on user's content reproduction history information stored in the content reproduction history information holding part 108, and supplies it to the optimal model selecting part 101. The content reproduction history information holding part 108 is a storage part that stores therein reproduction history information about reproduced contents of a user using the information processing apparatus 100.

The content feature extracting part 105 generates time series data of content feature volumes corresponding to a time series reproduction history matched with user's content reproduction history information stored in the content reproduction history information holding part 108. In other words, it acquires a feature volume related to a content held in the content information holding part 107, generates time series data of content feature volumes corresponding to content reproduction history information, and supplies it to the optimal model selecting part 101.

The optimal model selecting part 101 receives an input of time series data of content feature volumes corresponding to a content reproduction history from the content feature extracting part 105, and selects a probability model close to the inputted time series data of content feature volumes from a plurality of probability models held in the model information holding part 106. The detail of the selection technique of the probability model based on time series data of content feature volumes will be described later. In addition, the model information holding part 106 stores therein a plurality of probability models expressed by a hidden Markov model (HMM), for example.

The reproduction content selecting part 102 selects a content to be reproduced from the contents held in the content information holding part 107. To select the content, a user may specify the content, or a publicly known content recommendation technique may be used for selection, or a probability model, described later, may be used for selection. A content selected as a content to be reproduced is supplied to the playlist generating part 103.

The playlist generating part 103 decides the reproduction sequence of contents selected as reproduction targets according to a method, described later, and generates a playlist. In other words, the playlist generating part 103 uses a probability model to decide the reproduction sequence of contents, generates a playlist, and supplies it to the content reproducing part 104.

Based on the playlist generated in the playlist generating part 103, the content reproducing part 104 adapts content identification information such as the titles of contents described in the list to acquire contents from a content storage part, not shown, such as a hard disk, a DVD, or a flash memory for reproducing the contents.

In generating contents, the content reproducing part 104 further generates content reproduction history information, and supplies the generated content reproduction history information to the content reproduction history information holding part 108. The user's reproduction history is content reproduction sequence information based on a playlist, for example, content reproduction history information that the items of content identification information are arranged in the reproduction sequence. In addition, in the case in which a user does not reproduce a content in accordance with the playlist and skips the reproduction of the content, the content reproducing part 104 holds identification information about the skipped content, also acquires content information about the skipped content is also acquired, and supplies them to the content reproduction history information holding part 108.

The model adapting part 109 receives an input of reproduction history information held in the content reproduction history information holding part 108, and performs a process in which a probability model stored in the model information holding part 106 is adapted to user's tastes. The detail of this process will be described later.

All of the model information holding part 106, the content information holding part 107, and the content reproduction history information holding part 108 are configured of a data storage part, and as discussed above, the model information holding part 106 holds a plurality of probability models expressed by a hidden Markov model (HMM), for example, and the content information holding part 107 holds information about contents to be represented and reproduced to a user, and the feature volume extracted by the signal analysis of a content or the content feature volume such as metadata given as information corresponding to a content in advance. The content reproduction history information holding part 108 holds user's content reproduction history.

Figure 2:
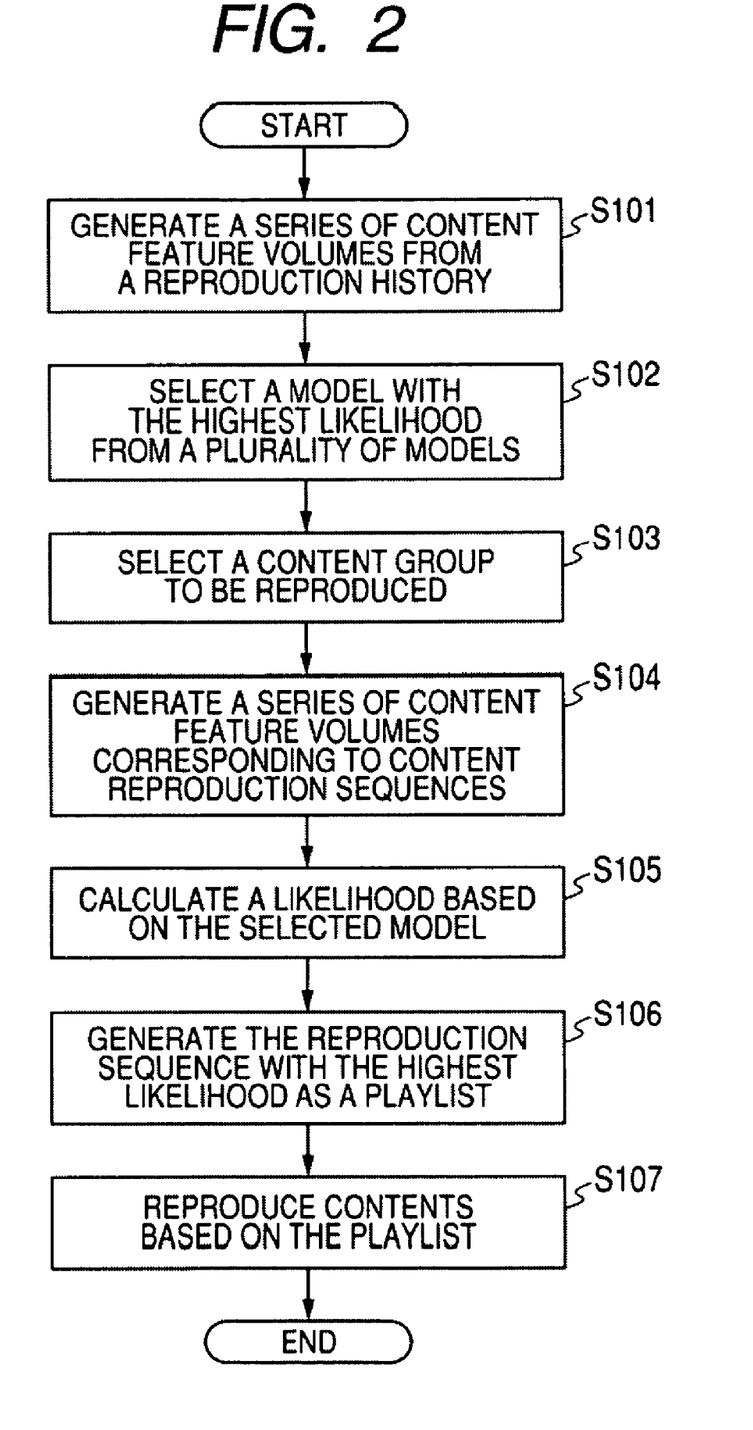
FIG. 2 shows a flow chart illustrative of a process sequence of generating a playlist and reproducing a content using the information processing apparatus according to an embodiment of the invention.

Next, the flow of a content reproduction process performed by the information processing apparatus 100 having the configuration shown in FIG. 1, that is, a process in which a playlist matched with user's tastes is generated to reproduce contents will be described with reference to a flow chart shown in FIG. 2. The process shown in FIG. 2 is started as it is triggered by a user making a request to start reproduction in accordance with a playlist through an input part of the information processing apparatus 100.

First, in Step S101, the content feature extracting part 105 generates time series data of content feature volumes corresponding to a time series reproduction history matched with user's content reproduction history information stored in the content reproduction history information holding part 108.

The content reproduction history information holding part 108 stores past content reproduction history information performed by a user with the use of the information processing apparatus 100. For example, it is information about:

(a) 2007/07/01: content A→content B→content C→content D (b) 2007/07/02: content F→content K→content P→content M (c) 2007/07/03: content Q→content A→content G→content D The content feature extracting part 105 extracts a feature volume of a content from user's reproduction history stored in the content reproduction history information holding part 108 in accordance with a time series reproduction sequence, and generates a series of content feature volumes.

Figure 3:
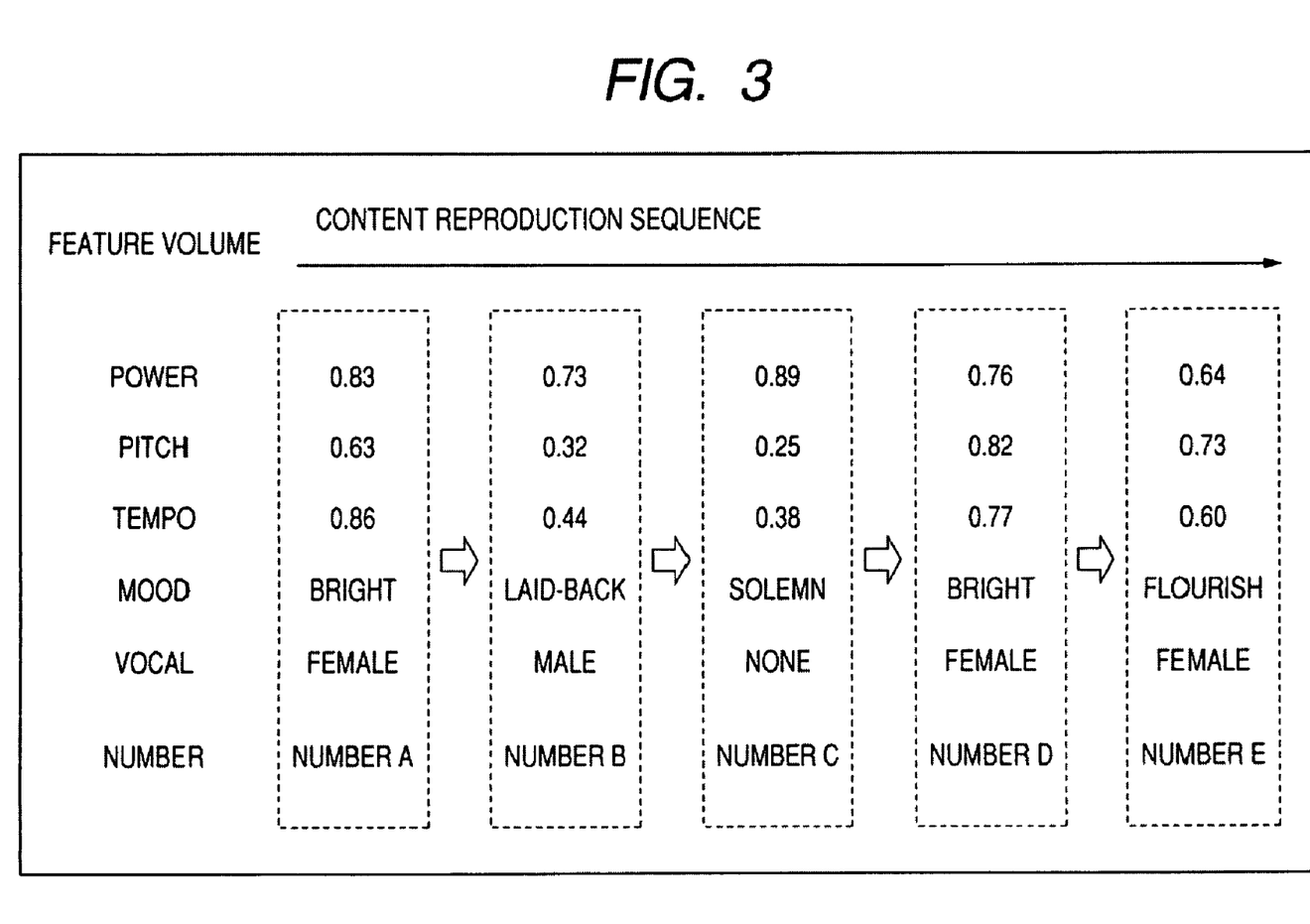
FIG. 3 shows a diagram depicting an exemplary data configuration of a series of content feature volumes generated by the information processing apparatus according to an embodiment of the invention.

For example, a series of content feature volumes shown in FIG. 3 is generated. The example shown in FIG. 3 is data that content feature volumes are arranged in the sequence of the content reproduction process performed by a user. The reproduction sequence of the contents is the order of number A, number B, number C, number D and number E. The content feature extracting part 105 generates a series of content feature volumes in which feature volumes (feature volumes such as the power, pitch, tempo, and types of mood and vocal of a piece of music) of contents corresponding to a user's reproduction history (number A→number B→number C→number D→number E) held in the content reproduction history information holding part 108 are arranged in the reproduction sequence.

The series of content feature volumes is that feature volumes such as power, pitch, and tempo determined in a signal processing manner and feature volumes such as the types of mood and vocal of a piece of music given as metadata are given as a sequence of feature volume vectors in accordance with the reproduction sequence of pieces of music. In addition, the feature volume may be data also having a numeric feature volume and a symbolic feature volume, or may be data having only either one.

Subsequently, in Step S102, based on the generated series of content feature volumes, a likelihood is calculated for each of a plurality of probability models held in the model information holding part 106 to select a model with the highest likelihood.

This process is a process performed by the optimal model selecting part 101 in which the optimal model selecting part 101 receives an input of time series data of content feature volumes corresponding to the content reproduction history from the content feature extracting part 105, and selects a probability model close to the inputted time series data of content feature volumes from a plurality of the probability models held in the model information holding part 106.

Figure 4:
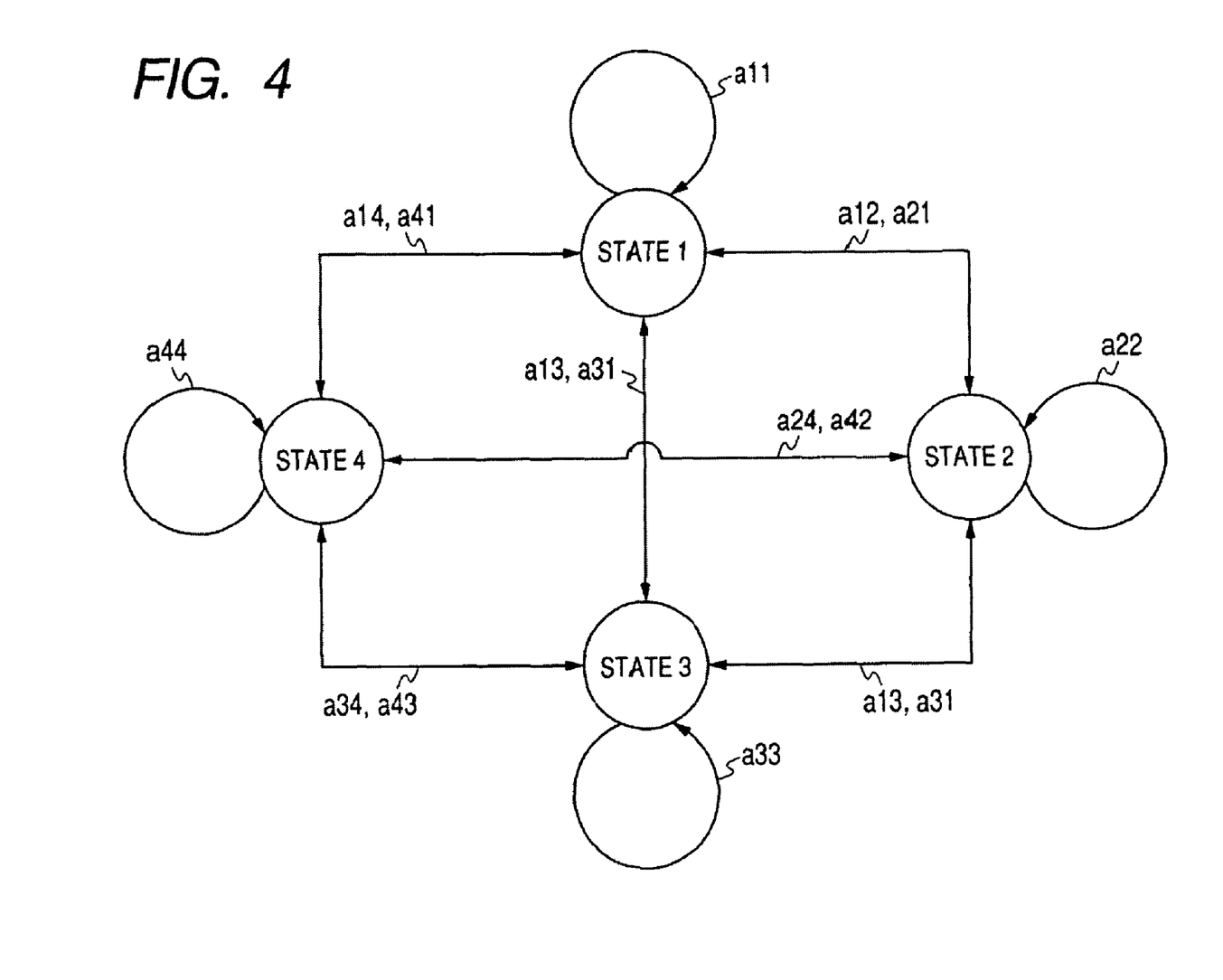
FIG. 4 shows a diagram illustrative of an exemplary probability model held in a model information holding part of the information processing apparatus according to an embodiment of the invention.

An exemplary probability model held in the model information holding part 106 is shown in FIG. 4. The probability model shown in FIG. 4 is one type of hidden Markov model (HMM), called an ergodic HMM. The example shown in FIG. 4 has four states, states 1 to 4, and indicates transition probabilities among state 1 to state 4 as anm. For example, the transition probability from state 1 to state 2 is a12, the transition probability from state 1 to state 3 is a13, and the transition probability from state 1 to state 1 is a11.

On the other hand, the individual states are assigned parameters for generating the output probabilities of feature volume vectors of a piece of music (power, pitch, tempo, and types of mood and vocal of a piece of music). More specifically, for the feature volume expressed by real values, parameters such as a mixed normal distribution are assigned, and parameters such as an occurrence probability table of individual discrete values are assigned in the case in which the feature volume takes discrete values such as metadata.

The model information holding part 106 has a plurality of such probability models. For example, these probability. models are created by learning based on sample data. The detail of a process for generating a probability model will be described later.

In Step 3102, time series data of content feature volumes corresponding to a time series reproduction history matched with user's content reproduction history information is checked against a plurality of the probability models held in the model information holding part 106, and the most analogous probability model, that is, a model with the highest likelihood is selected.

In other words, the optimal model selecting part 101 calculates the likelihood of time series data of content feature volumes corresponding to a time series reproduction history matched with user's content reproduction history information with each of a plurality of the probability models held in the model information holding part 106, and selects a model with the highest likelihood as the optimal model.

Subsequently, in Step S103, a plurality of contents to be reproduced in the reproduction content selecting part 102 is selected. To select the contents, a user may specify the contents, or a publicly known content recommendation technique may be used for selection, or a probability model may be used for selection. The technique of selecting contents to be reproduced using a probability model will be described later.

Figure 5:
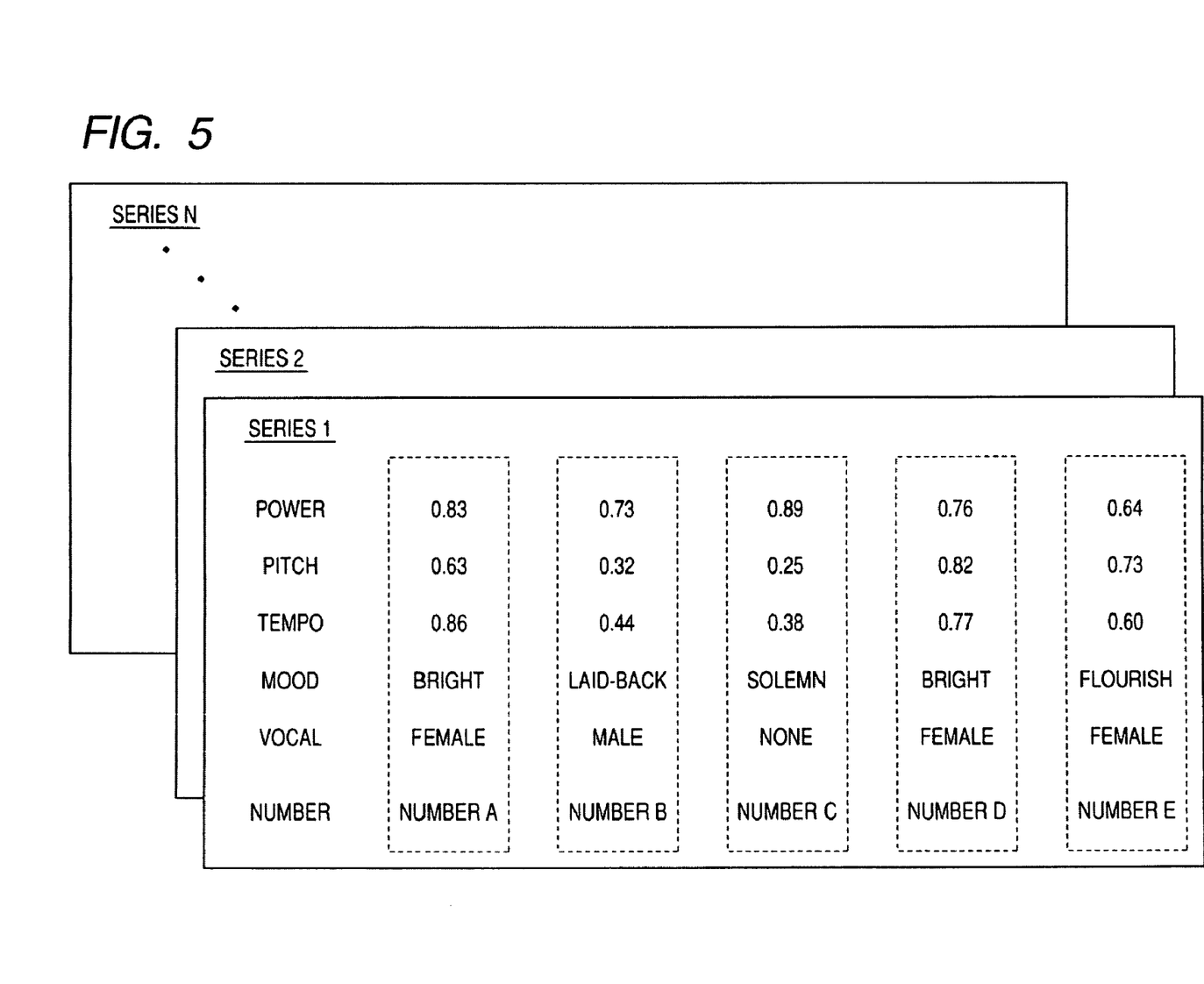
FIG. 5 shows a diagram illustrative of an exemplary data configuration of N series of content feature volumes corresponding to reproduction sequence candidates generated by a playlist generating part of the information processing apparatus according to an embodiment of the invention.

Subsequently, in Step S104, the playlist generating part 103 acquires information about selected contents from the reproduction content selecting part 102, and generates candidates of permutations of a plurality of the selected contents. For example, suppose there are five selected contents (A, B, C, D, and E), then, 5×4×3×2×1=120 ways of reproduction sequence candidates are generated as:
A→B→C→D→E,
A→B→C→E→D,
A→B→E→C→D, and so on, and N series of content feature volumes corresponding to these reproduction sequence candidates are generated. For example, as shown in FIG. 5, N series of content feature volumes are generated.

In Step S105, the playlist generating part 103 further calculates a likelihood of each of N series of content feature volumes with the probability model closest to the series of feature volumes corresponding to the reproduction history selected in Step S102 before.

In other words, the playlist generating part 103 calculates a likelihood of each of N series of content feature volumes corresponding to N candidates of reproduction sequence candidates set depending on the contents newly selected as contents to be reproduced with the probability model closest to the series of feature volumes corresponding to the reproduction history selected in Step S102 before, and selects the series of content feature volumes closest to the selected probability model.

Subsequently, in Step S106, the playlist generating part 103 generates a playlist in accordance with the permutations of the contents corresponding to the series of content feature volumes with the highest likelihood.

For example, as discussed above, suppose there are five selected contents (A, B, C, D, and E), then, 5×4×3'2×1=120 ways of reproduction sequence candidates are generated as:
A→B→C→D→E,
A→B→C→E→D,
A→B→E→C→D, and so on, and a series of content feature volumes corresponding to each of them is set. However, the series of content feature volumes closest to the probability model selected in Step S102 is selected from these series of content feature volumes, and a playlist is generated which has the sequence of contents corresponding to the selected series of content feature volumes.

In Step S107, the content reproducing part 104 reproduces contents in accordance with the playlist generated by the playlist generating part 103 in the process described above.

In addition, the exemplary process described above is described as an exemplary process in which the reproduction content selecting part 102 collectively selects a plurality of contents to be reproduced, and the playlist generating part 103 generates a playlist that defines the reproduction sequence of a plurality of the selected contents. However, for example, such a configuration may be possible in which the content selection process is performed as a process in consideration of a playlist in such a way that the reproduction content selecting part 102 takes account of the content reproduction history so far to in turn select a single content.

Next, the process steps of generating a probability model held in the model information holding part 106 shown in FIG. 1 will be described with reference to a flow chart shown in FIG. 6. As discussed above with reference to FIG. 4, for example, the probability model held in the model information holding part 106 is a probability model in accordance with a hidden Markov model (HMM), which is generated by learning based on sample data, for instance.

These process steps are performed in the model creating part 111 shown in FIG. 1. As discussed above, the model creating part 111 is a processing part that generates a probability model stored in the model information holding part 106, which is not necessary in the configuration in which the probability model is already stored in the model information holding part 106, and is not the essential configuration of the information processing apparatus 100. The model creating part 111 performs processes such as the generation and update of a probability model stored in the model information holding part 106. The process for generating a probability model performed by the model creating part 111 will be described with reference to a flow chart shown in FIG. 6.

First, in Step S201, as data used for learning, sample data having the reproduction sequence of contents is prepared. For this, for example, information about the sequence of individual pieces of music in a music album or data related to the reproduction sequence of contents of various people is used.

Subsequently, in Step S202, a series of content feature volumes corresponding to the reproduction sequence of contents of learning data is generated.

As discussed above, the content feature volume is a feature volume analyzed in a signal processing manner for each of contents or a feature volume given as metainformation, more specifically, for example, feature volumes such as power, pitch, tempo, mood, and vocal, and a series of content feature volumes to be generated based on learning data is also generated as a plurality of series of content feature volumes as similar to those described with reference to FIG. 5.

Subsequently, in Step S203, partial series are extracted from a group of the acquired series of content feature volumes. In extracting the partial series, a so-called data mining technique may be used to extract a series pattern frequently appeared, or N series of chain series may be simply extracted, or learning data may be used as unchanged.

Subsequently, in Step S204, a partial series group is divided into a plurality of clusters by using a clustering technique. In Steps S205 to S206, one probability model is allocated to each of the acquired individual clusters, and each of the probability models is learned by a group of the series of feature volumes allocated to each of the clusters.

In addition, as discussed above with reference to FIG. 4, for example, the probability model is a probability model in accordance with a hidden Markov model (HMM), and as described above, it is generated by learning based on sample data in the early stage. In addition, in the embodiment, the feature volume is feature volumes such as the power, pitch, tempo, and types of mood and vocal of a piece of music that are the feature volume of a content. The feature volume for use may have both of a numeric feature volume and a symbolic feature volume, or may have only either one. In learning the probability model in Steps S205 to S206, in the case in which both of a numeric feature volume and a symbolic feature volume are provided, for example, such learning may be performed that the feature volume is treated as multistream feature volumes.

By the process described above, a plurality of different probability models are created, and the created probability models are stored in the model information holding part 106.

Figure 7:
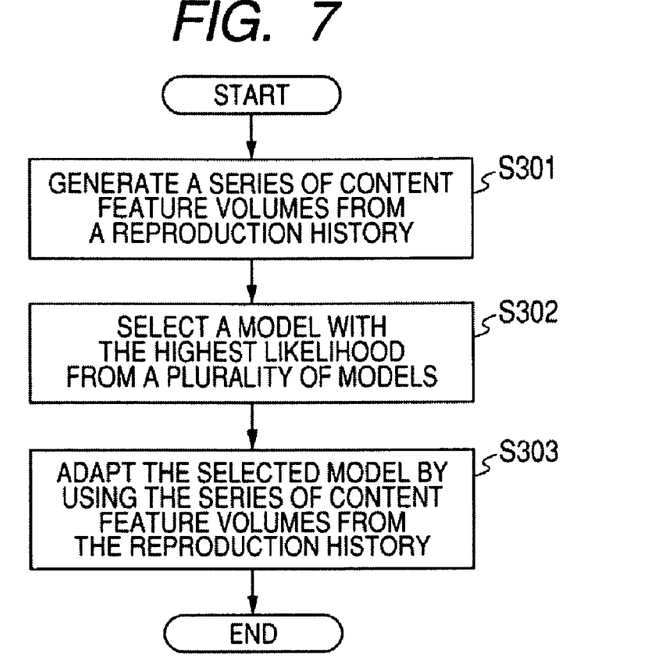
FIG. 7 shows a flowchart illustrative of a process sequence performed by a model adapting part of the information processing apparatus according to an embodiment of the invention in which a probability model stored in the model information holding part is updated and adapted to user's tastes.

Next, the process performed by the model adapting part 109 of the information processing apparatus 100 shown in FIG. 1, that is, the process sequence in which based on user's reproduction history information stored in the content reproduction history information holding part 108, the probability models stored in the model information holding part 106 are updated and adapted to user's tastes will be described with reference to a flow chart shown in FIG. 7.

Figure 6:
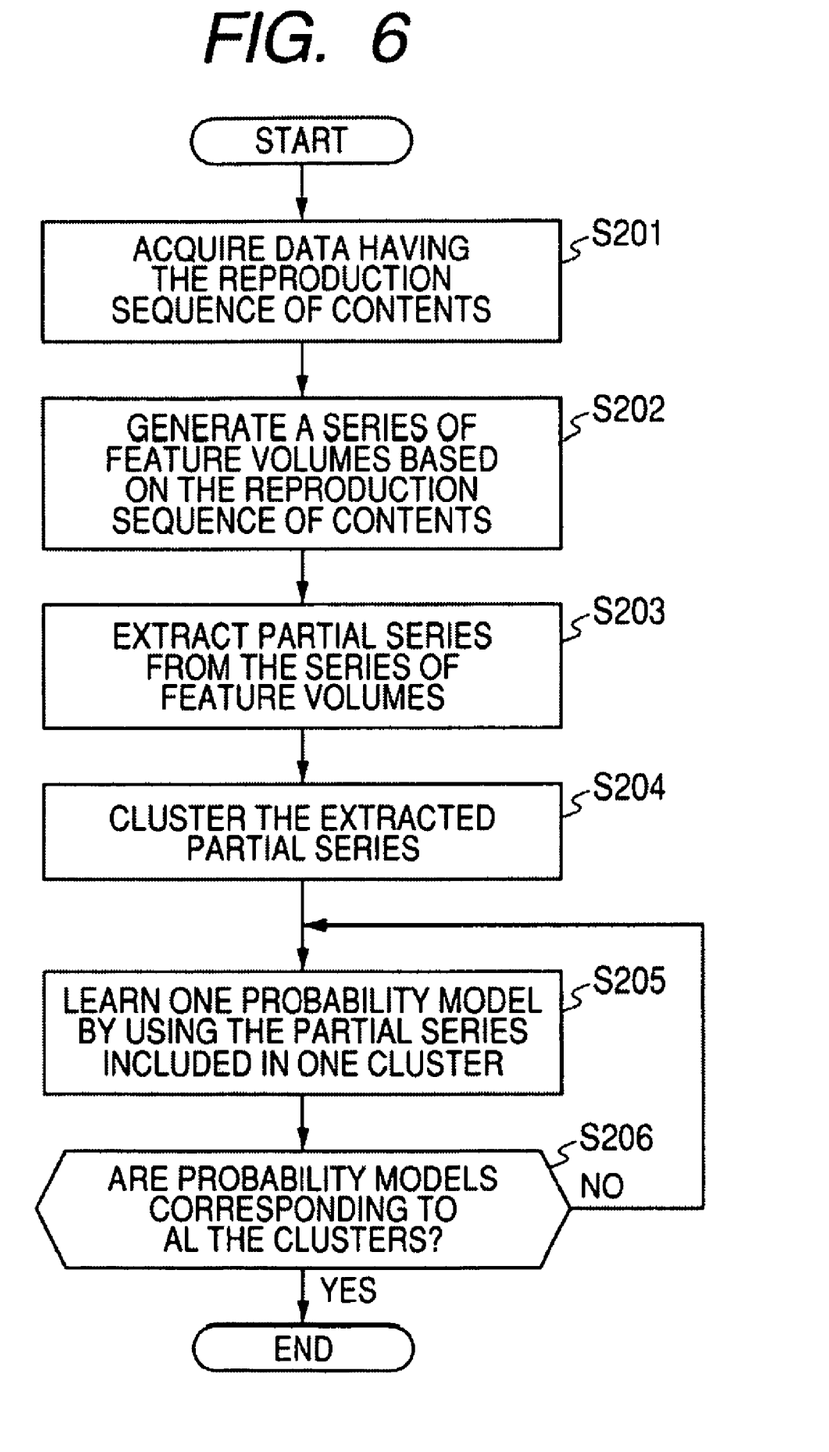
FIG. 6 shows a flow chart illustrative of a process sequence of generating a probability model held in the model information holding part of the information processing apparatus according to an embodiment of the invention.

First, in Step S301, as similar to the processes in Steps S201 to S202 of the flow shown in FIG. 6 described above, the model adapting part 109 receives an input of a user's content reproduction history stored in the content reproduction history information holding part 108, and generates a time series of content feature volumes corresponding to the reproduction sequence of contents in the reproduction history.

In other words, the model adapting part 109 acquires the feature volume of a content included in the user's content reproduction history stored in the content reproduction history information holding part 108 from the content information holding part 107, and generates a time series of content feature volumes in which content feature volumes are arranged in the reproduction sequence of contents.

Subsequently, in Step S302, the model adapting part 109 compares the generated time series of content feature volumes with each of a plurality of the probability models stored in the model information holding part 106, and selects the most analogous probability model, that is, a probability model having the highest likelihood with the generated time series of content feature volumes based on the user's content reproduction history.

Subsequently, in Step S303, the model adapting part 109 adapts parameters to the selected probability model based on the time series of content feature volumes generated depending on the user's content reproduction history. For the adapting technique, for example, a publicly known technique such as the technique of maximum aposteriori probability estimation (MAP estimation) can be used.

By the process described above, the probability models stored in the model information holding part 106 are updated to probability models having parameters close to the time series of content feature volumes generated based on the user's content reproduction history.

As discussed above with reference to FIG. 4, for example, the probability models stored in the model information holding part 106 are a probability model in accordance with a hidden Markov model (HMM), and in the initial stage, they are created by learning based on sample data, for example. The adaptation process described above is performed to update parameters in accordance with the reproduction history of a user who is performing content reproduction in the information processing apparatus 100, the user's tastes are reflected step by step, and the probability models are updated to probability models adapted to individual users.

Next, the process steps of selecting contents to be reproduced by using the probability models stored in the model information holding part 106 will be described with reference to a flow chart shown in FIG. 8.

As described in the content selection process in Step S103 in the process sequence of generating a playlist and reproducing contents shown in FIG. 2, in the case in which a plurality of the contents to be reproduced in the reproduction content selecting part 102 is selected, as a content selection technique, user specification, a process of using a publicly known content recommendation technique, or a selection process using a probability model is possible.

Hereinafter, the process steps of selecting contents to be reproduced by using a probability model stored in the model information holding part 106 will be described.

In addition, in the case in which a plurality of probability models are stored in the mode information holding part 106 before this process step is performed, a single probability model is selected. For selecting a probability model, for example, it is sufficient that a model is selected by the similar process as the processes in Steps S101 to S102 in the process sequence of generating a playlist and reproducing contents shown in FIG. 2. In other words, a probability model closest to the series of feature volumes corresponding to the user's reproduction history is selected (a probability model with the highest likelihood is selected).

Figure 8:
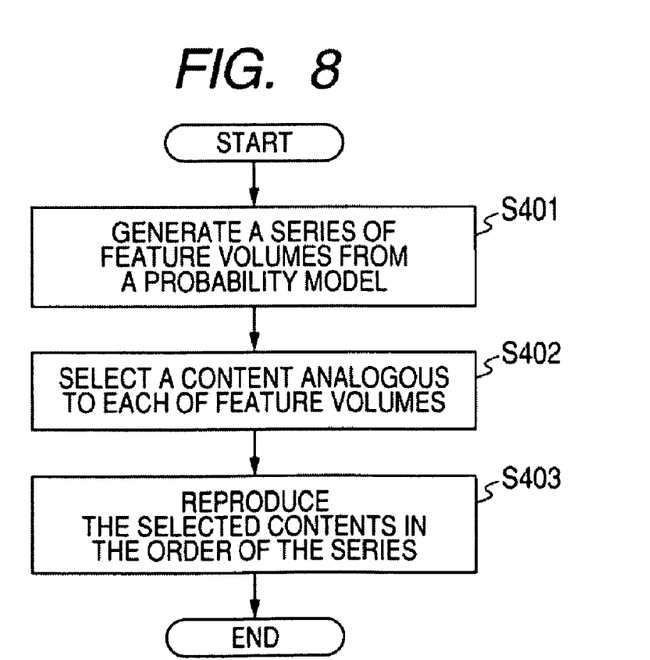
FIG. 8 shows a flowchart illustrative of a process sequence in which a probability model stored in the model information holding part of the information processing apparatus according to an embodiment of the invention is used to select a content to be reproduced.

After a single probability model is selected, in Step S401 of the flow shown in FIG. 8, the reproduction content selecting part 102 generates a series of feature volumes matched with the probability model in accordance with the parameters provided in the selected probability model. For example, in the case in which the probability model is a hidden Markov model (HMM) as described with reference to FIG. 4, the states of the HMM are transitioned depending on the transition probabilities, feature volume vectors are generated depending on the output probability of each of the states, and a series of feature volumes matched with the probability model is generated.

Subsequently, in Step S402, the reproduction content selecting part 102 selects content information having content feature volumes analogous to each of the feature volume vectors configuring the series of feature volumes matched with the probability model created in Step S401 from the content information holding part 107.

For example, in the case in which plurality of the feature volume vectors configuring the series of feature volumes matched with the probability model is the sequence below:

vector p→vector q→vector r, then, the following contents are selected from the feature volume vectors formed of the content feature volumes matched with each of the contents held in the content information holding part 107:

a content having the content feature volume close to vector p, a content having the content feature volume close to vector q, and a content having the content feature volume close to vector r.

In addition, more specifically, vectors p, q, and r are vectors formed of feature volumes such as power, pitch, tempo, mood, and vocal, for example.

Lastly, in Step S403, the reproduction content selecting part 102 arranges the items of content information selected from the content information holding part 107 in accordance with the series of feature volumes matched with the probability model, and outputs them to the playlist generating part 103. The playlist generating part 103 generates a playlist in a specified sequence, and the content reproducing part 104 reproduces the contents in accordance with the generated playlist.

As described above, a probability model stored in the model information holding part 106 is used to select contents to be reproduced, and then a playlist is generated and contents are reproduced.

In addition, in the discussion above, although specific scales to determine the similarity between feature volume vectors is not described, general criteria can be used including the Euclidean distance for the ratio scale expressed by real values, and the number of names matched or the cosine distance by a vector space method for the nominal scale such as metadata.

Finally, an exemplary hardware configuration of the information processing apparatus for implementing the processes described above will be described with reference to FIG. 9. A CPU (Central Processing Unit) 501 functions as a main part of implementing the process corresponding to an OS (Operating System) and the data processing part described in the embodiment. More specifically, the CPU performs the processes included in the discussion above such as the generation of a playlist, content reproduction control, content feature volume analysis, and the generation of a series of content feature volumes. These processes are executed in accordance with a computer program stored in a ROM in individual information processing apparatuses, and a data storage part such as a hard disk.

Figure 9:
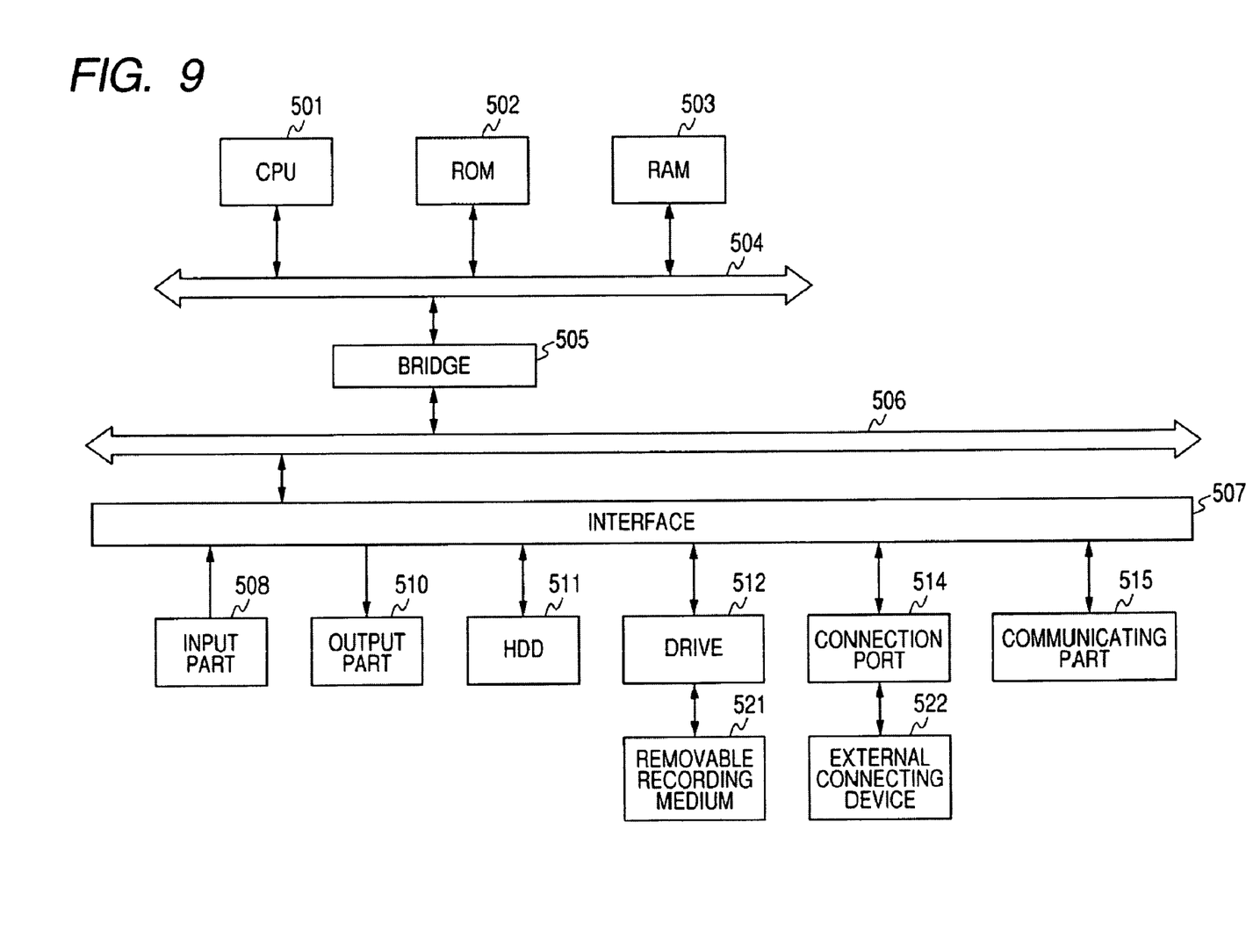
FIG. 9 shows a diagram illustrative of an exemplary hardware configuration of the information processing apparatus.

A ROM (Read Only Memory) 502 stores therein a program and computation parameters used by the CPU 501. A RAM (Random Access Memory) 503 stores therein a program used and executed by the CPU 501 and parameters properly changed depending on the execution. They are connected to each other through a host bus 504 formed of a CPU bus.

The host bus 504 is connected to an external bus 506 such as a PCI (Peripheral Component Interconnect/Interface) bus through a bridge 505.

An input part 508 is a keyboard and a pointing device, which is an input device manipulated by a user. An output part 510 is configured of a display and a speaker.

A HDD (Hard Disk Drive) 511 has a hard disk therein, and drives the hard disk to record or reproduce a program and information executed by the CPU 501. The hard disk is used as a storage unit for contents and metadata, for example, and various computer programs such as a data processing program are stored therein.

A drive 512 is mounted with a removal recording medium 521 such as a magnetic disk, an optical disk, a magneto-optical disk, or a semiconductor memory, which reads data or a program recorded thereon, and supplies the data or the program to the connected RAM 503 through the interface 507, the external bus 506, the bridge 505, and the host bus 504.

A connection port 514 is a port that connects to an external connecting device 522, having a connecting part such as a USB port and an IEEE 1394 port. The connection port 514 is connected to the CPU 501 through the interface 507, the external bus 506, the bridge 505, and the host bus 504. A communicating part 515 is connected to a network to perform communications over the network.

In addition, the exemplary hardware configuration of the information processing apparatus shown in FIG. 9 is an example of an apparatus configured by being adapted to a PC, and the information processing apparatus can be adapted to various apparatuses executable of the processes described in the embodiment, not limited to the configuration shown in FIG. 9.

As described above, the embodiment of the invention has been described in detail with reference to a specific embodiment. However, it is apparent that those skilled in the art can make modifications and substitutions within the scope not deviating from the teachings of the embodiment of the invention. In other words, the embodiment of the invention has been disclosed in the exemplified form, which should not be interpreted in a limited manner. In order to understand the teachings of the embodiment of the invention, the appended claims should be considered.

In addition, a sequence of the process steps described in the specification may be executed by hardware, or by software, or by the combined configuration of both. In the case in which the process steps are performed by software, a program recorded with the process sequence can be installed in a memory inside a computer incorporated in dedicated hardware for execution, or the program can be installed in a multi-purpose computer executable of various processes for execution. For example, the program can be recorded on a recording medium in advance. In addition to installing the program from the recording medium in the computer, the program can be received over a network such as a LAN (Local Area Network) and the Internet and installed in a built-in recording medium such as a hard disk.

In addition, various process steps described in the specification are performed in a time series as well as they may be performed in parallel or individually depending on the processing performance of an apparatus to perform these process steps or as necessary. In addition, the system in the specification is the configuration of logical assembly of a plurality of devices, which is not limited to one in which devices in individual configurations are provided in the same cabinet.

As discussed above, according to the embodiment of the invention, in the information processing apparatus which performs a process for generating a playlist that defines a reproduction sequence of contents, it is configured in which a probability model corresponding to a time series pattern of content feature volumes, the feature volume being feature information about a content, is stored in a model information holding part, a time series pattern of content feature volumes corresponding to each of a plurality of permutation patterns of a reproduction sequence of contents to be reproduced is compared with a probability model stored in the model information holding part (a likelihood is calculated), a playlist is generated in which a reproduction sequence of contents is set in accordance with a time series pattern of content feature volumes most analogous to the probability model, and contents are reproduced in accordance with the generated playlist. Thus contents can be reproduced in accordance with user's tastes.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus which performs a process for generating a playlist that defines a reproduction sequence of contents comprising:
    a model information holding part configured to store therein a plurality of probability models each corresponding to a time series pattern of content feature volumes, the content feature volume being feature information about a content;
    a content feature extracting part configured to acquire a content feature volume corresponding to each of a plurality of contents to be reproduced;
    a playlist generating part configured to compare a time series pattern of the content feature volumes extracted in the content feature extracting part corresponding to each of a plurality of permutation patterns of a reproduction sequence of contents to be reproduced with a probability model held in the model information holding part, and generates a playlist in which a reproduction sequence of contents is set in accordance with a time series pattern of content feature volumes most analogous to the probability model;
    a content reproducing part configured to generate and store content reproduction history information in a content reproduction history information holding part and reproduce contents in accordance with the playlist generated in the playlist generating part; and
    a model adapting part configured to perform a probability model update process in which the model adapting part generates a time series of content feature volumes corresponding to a reproduction history matched with content reproduction history information stored in the content reproduction history information holding part and adapts a parameter included in the generated time series of content feature volumes corresponding to the reproduction history to a probability model held in the model information holding part, whereby the model adapting part approximates the probability model to the time series of content feature volumes corresponding to the reproduction history.

2. The information processing apparatus according to claim 1,
    wherein the content reproducing part is configured to perform a process in which the content reproducing part generates and stores content reproduction history information in a content reproduction history information holding part,
    the information processing apparatus further includes:
        an optimal model selecting part configured to compare a time series pattern of content feature volumes corresponding to a reproduction history matched with content reproduction history information stored in the content reproduction history information holding part with a plurality of probability models held in the model information holding part, and to select a probability model most analogous to the time series pattern of content feature volumes corresponding to the reproduction history as an optimal model,
    wherein the playlist generating part compares a time series pattern of the content feature volumes extracted in the content feature extracting part corresponding to each of a plurality of permutation patterns of a reproduction sequence of contents to be reproduced with the optimal model, and generates a playlist in which a reproduction sequence of contents corresponding to a time series pattern of content feature volumes most analogous to the optimal model.

3. The information processing apparatus according to claim 1, further comprising:
    a model creating part configured to generate a probability model to which sample data containing a reproduction sequence of contents is adapted, to perform a learning process for the created probability model to create a plurality of different probability models, and to store the created probability model in the model information holding part.

4. The information processing apparatus according to claim 1, further comprising:
    a reproduction content selecting part configured to select a plurality of contents configured of a time series pattern of content feature volumes analogous to a probability model held in the model information holding part as contents to be reproduced.

5. The information processing apparatus according to claim 1,
    wherein the model information holding part is configured to store therein a probability model in accordance with a hidden Markov model (HMM) as a probability model corresponding to a time series pattern of content feature volumes, the content feature volume being feature information about a content.

6. The information processing apparatus according to claim 1,
wherein the content feature volume includes at least any one of feature information about a data signal configuring a content and metainformation corresponding to a content.

7. An information processing method which performs a process for generating a playlist that defines a reproduction sequence of contents in an information processing apparatus, the method comprising the steps of:
extracting a content feature wherein a content feature extracting part acquires a content feature volume corresponding to each of a plurality of contents to be reproduced;
generating a playlist wherein a playlist generating part compares a time series pattern of the content feature volumes extracted in the step of extracting a content feature corresponding to each of a plurality of permutation patterns of a reproduction sequence of contents to be reproduced with a probability model held in advance in a model information holding part, and generates a playlist in which a reproduction sequence of contents is set in accordance with a time series pattern of content feature volumes most analogous to the probability model;
reproducing contents wherein a content reproducing part reproduces contents in accordance with the playlist generated in the step of generating a playlist;
generating a content reproduction history wherein the content reproducing part generates and stores content reproduction history information in a content reproduction history information holding part; and
adapting a model wherein a model adapting part performs a process in which the model adapting part adapts a parameter included in a time series of content feature volumes corresponding to a reproduction history matched with content reproduction history information stored in the content reproduction history information holding part to a probability model held in the model information holding part, whereby the model adapting part approximates the probability model to the time series of content feature volumes corresponding to the reproduction history.

8. The information processing method according to claim 7, further comprising the steps of:
generating a content reproduction history wherein the content reproducing part generates and stores content reproduction history information in a content reproduction history information holding part; and
selecting an optimal model wherein an optimal model selecting part compares a time series pattern of content feature volumes corresponding to a reproduction history matched with content reproduction history information stored in the content reproduction history information holding part with a plurality of probability models held in the model information holding part, and selects a probability model most analogous to the time series pattern of content feature volumes corresponding to the reproduction history as an optimal model,
wherein the step of generating a playlist is the step of comparing a time series pattern of the content feature volumes extracted in the step of extracting a content feature corresponding to each of a plurality of permutation patterns of a reproduction sequence of contents to be reproduced with the optimal model, and generating a playlist in which a reproduction sequence of contents corresponding to a time series pattern of content feature volumes most analogous to the optimal model.

9. The information processing method according to claim 7, further comprising the step of:
generating a model wherein a model creating part generates a probability model to which sample data containing a reproduction sequence of contents is adapted, performs a learning process for the created probability model to create a plurality of different probability models, and stores the created probability model in the model information holding part.

10. The information processing method according to claim 7, further comprising the step of:
selecting contents to be reproduced wherein a reproduction content selecting part selects a plurality of contents configured of a time series pattern of content features volumes analogous to a probability model held in the model information holding part as contents to be reproduced.

11. The information processing method according to claim 7,
wherein the model information holding part is configured to store therein a probability model in accordance with a hidden Markov model (HMM) as a probability model corresponding to a time series pattern of content feature volumes, the content feature volume being feature information about a content.

12. The information processing method according to claim 7,
wherein the content feature volume includes at least any one of feature information about a data signal configuring a content and metainformation corresponding to a content.

13. A computer program which allows an information processing apparatus to perform a process for generating a playlist that defines a reproduction sequence of contents, the process comprising the steps of:
extracting a content feature wherein a content feature extracting part is allowed to acquire a content feature volume corresponding to each of a plurality of contents to be reproduced;
generating a playlist wherein a playlist generating part is allowed to compare a time series pattern of the content feature volumes extracted in the step of extracting a content feature corresponding to each of a plurality of permutation patterns of a reproduction sequence of contents to be reproduced with a probability model held in advance in a model information holding part and to generate a playlist in which a reproduction sequence of contents is set in accordance with a time series pattern of content feature volumes most analogous to the probability model;
reproducing contents wherein a content reproducing part is allowed to reproduce contents in accordance with the playlist generated in the step of generating a playlist;
generating a content reproduction history wherein the content reproducing part generates and stores content reproduction history information in a content reproduction history information holding part; and
adapting a model wherein a model adapting part performs a process in which the model adapting part adapts a parameter included in a time series of content feature volumes corresponding to a reproduction history matched with content reproduction history information stored in the content reproduction history information holding part to a probability model held in the model information holding part, whereby the model adapting part approximates the probability model to the time series of content feature volumes corresponding to the reproduction history.

* * * * *

UNITED STATES PATENT AND TRADEMARK OFFICE
CERTIFICATE OF CORRECTION

PATENT NO. : 7,777,121 B2  Page 1 of 1
APPLICATION NO. : 12/189081
DATED : August 17, 2010
INVENTOR(S) : Yasuharu Asano It is certified that error appears in the above-identified patent and that said Letters Patent is hereby corrected as shown below:

In claim 2, column 16, line 39, "corresponding" should read
--corresponds--.

In claim 8, column 18, line 3, "corresponding" should read
--corresponds--.

In claim 10, column 18, line 18, "content features" should read
--content feature--.

Signed and Sealed this

Twenty-third Day of November, 2010

David J. Kappos
*Director of the United States Patent and Trademark Office*